US012681463B2

(12) United States Patent
Meng et al.

(10) Patent No.: US 12,681,463 B2
(45) Date of Patent: Jul. 14, 2026

(54) INFORMATION PROVIDING METHOD AND SYSTEM

(71) Applicant: Siemens Aktiengesellschaft, Munich (DE)

(72) Inventors: Xian Tao Meng, Langfang (CN); Shun Jie Fan, Beijing (CN); Bin Zhang, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1134 days.

(21) Appl. No.: 17/280,232

(22) PCT Filed: Sep. 27, 2019

(86) PCT No.: PCT/EP2019/076236
§ 371 (c)(1),
(2) Date: Mar. 26, 2021

(87) PCT Pub. No.: WO2020/065032
PCT Pub. Date: Apr. 2, 2020

(65) Prior Publication Data
US 2022/0050441 A1 Feb. 17, 2022

(30) Foreign Application Priority Data
Sep. 29, 2018 (CN) .......................... 201811151189.9

(51) Int. Cl.
*G06F 16/182* (2019.01)
*G05B 19/418* (2006.01)
(Continued)

(52) U.S. Cl.
CPC ....... *G05B 19/4185* (2013.01); *G06F 16/182* (2019.01); *G06Q 10/20* (2013.01);
(Continued)

(58) Field of Classification Search
None
See application file for complete search history.

(56) References Cited

U.S. PATENT DOCUMENTS 5,463,768 A * 10/1995 Cuddihy ............... G06F 11/079
714/37
8,195,426 B1 6/2012 Antanies
(Continued)

FOREIGN PATENT DOCUMENTS

CN 1620836 A 5/2005
CN 102890689 A 1/2013
(Continued)

OTHER PUBLICATIONS

PCT International Search Report and Written Opinion of International Searching Authority mailed Jan. 7, 2020 corresponding to PCT International Application No. PCT/EP2018/076268 filed Sep. 27, 2019.

*Primary Examiner* — Sherief Badawi
*Assistant Examiner* — Jessica N Le
(74) *Attorney, Agent, or Firm* — Harness, Dickey & Pierce, P.L.C.

(57) ABSTRACT

Disclosed are an information providing method and system. In an embodiment, the method includes: acquiring product data and/or historical operation data; determining at least one feature description tag of an industrial product based upon the product data, and taking the at least one feature description tag of the industrial product as a feature of the industrial product; and/or determining at least one feature description tag of a user based upon the historical operation data, and taking the at least one feature description tag of the user as a feature of the user. The method further includes sending the feature of the industrial product and/or the feature of the user to a human-machine interactive device for display on a human-machine interactive interface. An (Continued)

embodiment further provides a reference suggestion for operative control of the industrial product by the user.

11 Claims, 4 Drawing Sheets

(51) Int. Cl.

| | |
|---|---|
| *G06F 16/335* | (2019.01) |
| *G06Q 10/20* | (2023.01) |
| *G06Q 50/04* | (2012.01) |
| *G06V 10/44* | (2022.01) |
| *G06V 10/75* | (2022.01) |

(52) U.S. Cl.
CPC ............. *G06Q 50/04* (2013.01); *G06V 10/44* (2022.01); *G06V 10/757* (2022.01); *G06F 16/335* (2019.01)

(56) References Cited

U.S. PATENT DOCUMENTS

| | | | |
|---|---|---|---|
| 9,031,951 | B1 | 5/2015 | Baluja et al. |
| 9,818,127 | B2 * | 11/2017 | Iyoob ................. G06Q 30/0206 |
| 10,599,982 | B2 * | 3/2020 | Pal .......................... H04L 67/12 |
| 11,644,815 | B2 * | 5/2023 | Mehrotra ........... G05B 19/4155 |
| | | | 700/28 |
| 2006/0111122 | A1 | 5/2006 | Carlson et al. |
| 2009/0089682 | A1 | 4/2009 | Baier et al. |
| 2012/0143816 | A1 * | 6/2012 | Zhang .................. G06F 16/951 |
| | | | 707/E17.014 |
| 2013/0211559 | A1 | 8/2013 | Lawson et al. |
| 2014/0012840 | A1 * | 1/2014 | Han ...................... G06F 16/951 |
| | | | 707/723 |
| 2014/0047107 | A1 | 2/2014 | Maturana et al. |
| 2014/0336795 | A1 | 11/2014 | Asenjo et al. |
| 2014/0337429 | A1 * | 11/2014 | Asenjo ................... H04L 67/10 |
| | | | 709/204 |
| 2015/0120010 | A1 * | 4/2015 | Hashimoto ............ H04L 67/10 |
| | | | 700/83 |
| 2015/0287318 | A1 * | 10/2015 | Nair ...................... G06Q 10/10 |
| | | | 340/5.6 |
| 2016/0132538 | A1 * | 5/2016 | Bliss ...................... G06F 16/20 |
| | | | 707/741 |
| 2016/0274558 | A1 * | 9/2016 | Strohmenger ......... G05B 15/02 |
| 2016/0330291 | A1 | 11/2016 | Asenjo et al. |
| 2017/0192414 | A1 | 7/2017 | Mukkamala et al. |
| 2017/0300042 | A1 * | 10/2017 | Pauly ................. G05B 19/4186 |
| 2017/0351226 | A1 * | 12/2017 | Bliss ................. G05B 19/4063 |
| 2018/0165745 | A1 * | 6/2018 | Zhu .................... G06Q 30/0631 |
| 2018/0205803 | A1 | 7/2018 | Asenjo et al. |
| 2018/0309770 | A1 * | 10/2018 | Han ...................... G06N 20/00 |
| 2018/0357334 | A1 * | 12/2018 | Chao ................. G05B 19/41885 |
| 2019/0042955 | A1 * | 2/2019 | Cahill ...................... G06N 5/04 |
| 2019/0064787 | A1 * | 2/2019 | Maturana ........... G05B 23/0227 |
| 2019/0166101 | A1 * | 5/2019 | Ramos .................. H04L 9/3239 |
| 2019/0188737 | A1 | 6/2019 | Asenjo et al. |
| 2019/0236508 | A1 * | 8/2019 | Sage ...................... G06Q 50/04 |
| 2020/0012265 | A1 * | 1/2020 | Thomsen ................ G06F 1/163 |
| 2020/0034656 | A1 | 1/2020 | Shi et al. |
| 2020/0068759 | A1 * | 2/2020 | Cvijetinovic ...... H05K 13/0895 |
| 2020/0218240 | A1 * | 7/2020 | Håkansson ........ G06Q 10/0631 |
| 2021/0182077 | A1 * | 6/2021 | Chen .................... G06F 7/5443 |
| 2021/0373547 | A1 * | 12/2021 | Kane .................. G05B 23/0272 |
| 2022/0137582 | A1 | 5/2022 | Strohmenger et al. |

FOREIGN PATENT DOCUMENTS

| | | |
|---|---|---|
| CN | 103823908 A | 5/2014 |
| CN | 104142660 A | 11/2014 |
| CN | 104142662 A | 11/2014 |
| CN | 104216881 A | 12/2014 |
| CN | 104537115 A | 4/2015 |
| CN | 105975609 A | 9/2016 |
| CN | 105988451 A | 10/2016 |
| CN | 106483929 A | 3/2017 |
| CN | 106529684 A | 3/2017 |
| CN | 106952111 A | 7/2017 |
| CN | 106997358 A | 8/2017 |
| CN | 108304435 A | 7/2018 |

* cited by examiner

INFORMATION PROVIDING METHOD AND SYSTEM

PRIORITY STATEMENT

This application is the national phase under 35 U.S.C. § 371 of PCT International Application No. PCT/EP2019/076236 which has an International filing date of Sep. 27, 2019, which designated the United States of America and which claims priority to Chinese application CN 201811151189.9 filed Sep. 29, 2018, the entire contents of each of which are hereby incorporated herein by reference.

FIELD

Embodiments of the disclosure generally relate to the technical field of computer control, in particular to an information providing method and system.

BACKGROUND

An industrial automation product (e.g. numerically controlled machine tool, frequency converter, etc.) has many functions, parameters and operations. Users operating industrial automation products have multiple features, e.g. maintenance engineer, operative worker, etc., and different user features have different work objectives, operating habits, etc., hence there is a need to provide some adaptive individualized information for operation of a particular industrial product for a particular user, to achieve effectiveness and high efficiency of operation.

SUMMARY

In view of the above, at least one embodiment of the present invention provides an information providing method and/or system, which are capable of providing some adaptive individualized information, to provide a reference for operative control of an industrial product by a user.

In one aspect, an embodiment of the present invention provides an information providing method, comprising: an edge computing device acquiring product data of an industrial product and/or historical operation data of a user operating the industrial product; the edge computing device determining at least one feature description tag of the industrial product on the basis of the product data, and taking the at least one feature description tag of the industrial product as a feature of the industrial product; and/or determining at least one feature description tag of the user on the basis of the historical operation data, and taking the at least one feature description tag of the user as a feature of the user; and the edge computing device sending the feature of the industrial product and/or the feature of the user to a human-machine interactive device for display on a human-machine interactive interface of the human-machine interactive device. In an embodiment of the present invention, on the basis of the acquired product data and historical operation data, the edge computing device obtains by analysis the user feature and the feature of the industrial product, which are then displayed on the human-machine interactive interface; the user feature and the feature of the industrial product are both described by at least one feature description tag; specifics such as the user's work content, work objectives and common operations can be learned by way of the at least one feature description tag of the user, and specifics such as the industrial product's work characteristics, common operations and function characteristics can be learned by way of the at least one feature description tag of the industrial product. The abovementioned user and industrial product specifics can provide a rational reference for operative control of the industrial product by the user, thereby achieving high efficiency and effectiveness of operative control.

In another aspect, the present invention provides an information providing system, comprising: a human-machine interactive device; an industrial product; and an edge computing device, wherein the edge computing device is connected to the human-machine interactive device and the industrial product, and the edge computing device is used for acquiring product data of the industrial product and/or historical operation data of a user operating the industrial product; determining at least one feature description tag of the industrial product on the basis of the product data, and taking the at least one feature description tag of the industrial product as a feature of the industrial product; and/or determining at least one feature description tag of the user on the basis of the historical operation data, and taking the at least one feature description tag of the user as a feature of the user; and sending the feature of the industrial product and/or the feature of the user to the human-machine interactive device for display on a human-machine interactive interface of the human-machine interactive device.

BRIEF DESCRIPTION OF THE ACCOMPANYING DRAWINGS

Preferred embodiments of the present invention are described in detail below with reference to the accompanying drawings, to give those skilled in the art a clearer understanding of the abovementioned and other features and advantages of the present invention. Drawings.

KEY TO THE DRAWINGS

Figure 1:
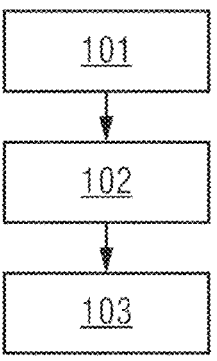
FIG. 1 is a schematic flow chart of an information providing method in an embodiment of the present invention.

| 101-103 | steps |
| 200 | information providing system |
| 201a-201e | various industrial products |
| 202 | human-machine interactive device |
| 203 | edge computing device |
| 204 | gateway and/or firewall |
| 205 | cloud platform |
| 301 | user feature icon |
| 302 | industrial product feature icon |
| 303a, 303b | recommended basic cloud function |

-continued

| 304a, 304b | recommended high-level cloud function |
| 401a-401h | multiple feature description tags of user feature |
| 402a-402h | multiple feature description tags of industrial product feature |
| 501 | parameter value input box on operation recommendation interface |
| 502 | parameter recommended value display box on an operation recommendation interface |
| 503 | minimum value of parameter on an operation recommendation interface |
| 504 | maximum value of parameter on an operation recommendation interface |
| 505 | current value of parameter on an operation recommendation interface |
| 601a-601c | multiple fault warnings on an operation recommendation interface |
| 602a-602c | multiple fault causes and corresponding maintenance suggestions on an operation recommendation interface |

DETAILED DESCRIPTION OF THE EXAMPLE EMBODIMENTS

In one aspect, an embodiment of the present invention provides an information providing method, comprising: an edge computing device acquiring product data of an industrial product and/or historical operation data of a user operating the industrial product; the edge computing device determining at least one feature description tag of the industrial product on the basis of the product data, and taking the at least one feature description tag of the industrial product as a feature of the industrial product; and/or determining at least one feature description tag of the user on the basis of the historical operation data, and taking the at least one feature description tag of the user as a feature of the user; and the edge computing device sending the feature of the industrial product and/or the feature of the user to a human-machine interactive device for display on a human-machine interactive interface of the human-machine interactive device. In an embodiment of the present invention, on the basis of the acquired product data and historical operation data, the edge computing device obtains by analysis the user feature and the feature of the industrial product, which are then displayed on the human-machine interactive interface; the user feature and the feature of the industrial product are both described by at least one feature description tag; specifics such as the user's work content, work objectives and common operations can be learned by way of the at least one feature description tag of the user, and specifics such as the industrial product's work characteristics, common operations and function characteristics can be learned by way of the at least one feature description tag of the industrial product. The abovementioned user and industrial product specifics can provide a rational reference for operative control of the industrial product by the user, thereby achieving high efficiency and effectiveness of operative control.

In some embodiments, the step of the edge computing device determining at least one feature description tag of the industrial product on the basis of the product data comprises: the edge computing device extracting from the product data a key field describing the industrial product, computing a degree of similarity between the extracted key field and multiple preset product feature description tags respectively, and determining a product feature description tag with a degree of similarity higher than a first predetermined value as a feature description tag of the industrial product; and/or the step of the edge computing device determining at least one feature description tag of the user on the basis of the historical operation data comprises: the edge computing device extracting from the historical operation data a key field describing the user; computing a degree of similarity between the extracted key field and multiple preset user feature description tags respectively; and determining a user feature description tag with a degree of similarity higher than a second predetermined value as a feature description tag of the user. In an embodiment of the present invention, the degree of similarity between the key field in the product data and the multiple preset product feature description tags respectively is computed, and then at least one product feature description tag with a high degree of similarity is selected as the feature of the industrial product; the way in which the user feature is determined is similar to the way in which the industrial product feature is determined. This kind of computing method is simple and easy to implement.

In some embodiments, the method further comprises: the edge computing device sending the feature of the industrial product and the feature of the user to a cloud platform; the cloud platform determining a recommended cloud function of the industrial product on the basis of the feature of the industrial product and the feature of the user, and sending the recommended cloud function via the edge computing device to the human-machine interactive device for display on the human-machine interactive interface. Since an embodiment of the present invention further uses the cloud platform to determine the recommended cloud function, the recommended cloud function which is individualized information is then displayed on the human-machine interactive device, in order to provide a reference suggestion for the use of an industrial product function by the user.

In some embodiments, the step of the cloud platform determining a recommended cloud function of the industrial product on the basis of the feature of the industrial product and the feature of the user comprises: the cloud platform computing a degree of interest of the user for multiple preset cloud functions respectively on the basis of the feature of the industrial product and the feature of the user; and determining a cloud function with a degree of interest higher than a third predetermined value as the recommended cloud function. In an embodiment of the present invention, the degree of interest of the user for multiple cloud functions respectively is computed, and then a cloud function with a high degree of interest is selected as a recommended function; this manner is simple and easy to implement.

In some embodiments, the cloud platform uses a first formula to compute the degree of interest of the user for each cloud function, the first formula comprising:

$$\text{interest1} = \mu_{User} \sum_{k=1}^{N} p_{User, k} * q_{k, Func} +$$
$$\mu_{product} \sum_{k=1}^{N} p_{product, k} * q_{k, Func}$$

In the formula, interest1 denotes the degree of interest of the user for the cloud function; $\mu_{User}$ denotes a weighting value of a relationship between the user and the cloud function; N denotes the number of feature description tags of the cloud function; $p_{User, k}$ denotes a degree of correlation of the user for a kth feature description tag of the cloud function; $q_{k, Func}$ denotes a weighting value of the kth feature description tag of the cloud function; $\mu_{product}$ denotes a weighting value of a relationship between the industrial product and the cloud function; $p_{product, k}$ denotes a degree of correlation of the industrial product for the kth feature description tag of the cloud function.

In some embodiments, the step of the cloud platform determining a recommended cloud function of the industrial product on the basis of the feature of the industrial product and the feature of the user comprises: the cloud platform subjecting multiple preset cloud functions to collaborative filtering on the basis of the feature of the industrial product, to obtain at least one first cloud function; subjecting multiple preset cloud functions to collaborative filtering on the basis of the feature of the user, to obtain at least one second cloud function; and determining a joint cloud function of the at least one first cloud function and the at least one second cloud function as the recommended cloud function. The use of collaborative filtering to determine the recommended cloud function in an embodiment of the present invention can increase algorithm speed and robustness.

In some embodiments, the method further comprises: the edge computing device sending the feature of the industrial product, the feature of the user and current operation information of the user for the industrial product to a cloud platform; the cloud platform determining a recommended operation of the user for the industrial product on the basis of the feature of the industrial product, the feature of the user and the current operation information, and sending the recommended operation via the edge computing device to the human-machine interactive device for display on the human-machine interactive interface. An embodiment of the present invention further determines the recommended operation via the cloud platform, and displays same on the human-machine interactive device, providing a reference, guidance and a suggestion etc. for operation of the industrial product by the user.

In some embodiments, the step of the cloud platform determining a recommended operation of the user for the industrial product on the basis of the feature of the industrial product, the feature of the user and the current operation information, comprises: the cloud platform computing a degree of interest of the user for multiple preset historical operations on the basis of the feature of the industrial product, the feature of the user and the current operation information, and determining a historical operation with a degree of interest higher than a fourth predetermined value as the recommended operation. In an embodiment of the present invention, the degree of interest of the user for multiple historical operations respectively is computed, and then a historical operation with a high degree of interest is selected and determined as the recommended operation; this manner is simple and easy to implement.

In some embodiments, the cloud platform uses a second formula to compute the degree of interest of the user for each historical operation, the second formula comprising:

$$\text{interest2} = \mu'_{User} \sum\nolimits_{K=1}^{M} p'_{User, k} {}^*q_{k, Operation} +$$
$$\mu'_{product} \sum\nolimits_{K=1}^{M} p'_{product, k} {}^*q_{k, Operation}$$

Here, interest2 denotes the degree of interest of the user for the historical operation; $\mu'_{User}$ denotes a weighting value of a relationship between the user and the historical operation; $\dot{p}_{User, k}'$ denotes a degree of correlation of the user for a kth feature description tag of the historical operation; $q_{k, Operation}$ denotes a weighting value of the kth feature description tag of the historical operation; $\mu'_{product}$ denotes a weighting value of a relationship between the industrial product and the historical operation; $\dot{p}_{product, k}'$ denotes a degree of correlation of the industrial product for the kth feature description tag of the historical operation; M is the number of feature description tags of the historical operation.

In another embodiment, the present invention provides an information providing system, comprising: a human-machine interactive device; an industrial product; and an edge computing device, wherein the edge computing device is connected to the human-machine interactive device and the industrial product, and the edge computing device is used for acquiring product data of the industrial product and/or historical operation data of a user operating the industrial product; determining at least one feature description tag of the industrial product on the basis of the product data, and taking the at least one feature description tag of the industrial product as a feature of the industrial product; and/or determining at least one feature description tag of the user on the basis of the historical operation data, and taking the at least one feature description tag of the user as a feature of the user; and sending the feature of the industrial product and/or the feature of the user to the human-machine interactive device for display on a human-machine interactive interface of the human-machine interactive device.

In some embodiments, the system further comprises: a cloud platform;
  wherein the edge computing device is further used for sending the feature of the industrial product and the feature of the user to the cloud platform; the cloud platform is used for determining a recommended cloud function of the industrial product on the basis of the feature of the industrial product and the feature of the user, and sending the recommended cloud function via the edge computing device to the human-machine interactive device for display on the human-machine interactive interface.

In some embodiments, the system further comprises: a cloud platform;
  wherein the edge computing device is further used for sending the feature of the industrial product, the feature of the user and current operation information of the user for the industrial product to the cloud platform; the cloud platform is used for determining a recommended operation of the user for the industrial product on the basis of the feature of the industrial product, the feature of the user and the current operation information, and sending the recommended operation via the edge computing device to the human-machine interactive device for display on the human-machine interactive interface.

To enable clearer understanding of the technical features, objectives and effects of aspects of the invention, particular embodiments of the present invention are now explained with reference to the accompanying drawings, in which identical labels indicate structurally identical components or components with similar structures but identical functions.

As used herein, "schematic" means "serving as an instance, example or illustration". No drawing or embodiment described herein as "schematic" should be interpreted as a more preferred or more advantageous technical solution.

To make the drawings appear uncluttered, only those parts relevant to the present invention are shown schematically in the drawings; they do not represent the actual structure thereof as a product. Furthermore, to make the drawings appear uncluttered for ease of understanding, in the case of components having the same structure or function in certain drawings, only one of these is drawn schematically, or only one is marked.

In one embodiment, the present invention provides an information providing method; as shown in FIG. 1, in box S101, an edge computing device acquires product data of an industrial product and/or historical operation data of a user operating the industrial product.

In one example, the edge computing device can acquire the product data and/or historical operation data in response to trigger information from a human-machine interactive device. Specifically, when an operation on an industrial product is received on a human-machine interactive interface of the human-machine interactive device, trigger information can be sent to the edge computing device, e.g. once the user has performed an operation on an industrial product on the human-machine interactive interface of the human-machine interactive device, the edge computing device can be triggered to perform the operations in boxes S101-103.

As can be understood, the human-machine interactive device has the human-machine interactive interface, and an operation on an industrial product can be realized via the human-machine interactive device. There is no restriction on the specific form of the human-machine interactive device, which may be a common user terminal, e.g. a mobile phone, tablet or PC, etc., and could also be a special-purpose device for subjecting an industrial product to operative control.

As can be understood, the industrial product may be a numerically controlled machine tool (abbreviated as CNC), a programmable logic controller (PLC), a driver or a frequency converter, etc.

As can be understood, the user is a user who uses the human-machine interactive device to subject an industrial product to operative control.

The manner of connection between the edge computing device and the industrial product and between the edge computing device and the human-machine interactive device may be a network connection.

For example, in a working site, a user A logs into an operative control system on an on-site human-machine interactive device; when logging into the system, the user A must input information such as a username and password, to determine whether the user A is a registered user of the operative control system and whether registered user login information is correctly filled in. Having logged into the system, the user A will see multiple industrial products; these industrial products are on-site industrial devices, and are all connected to the edge computing device. The user A can subject these industrial products to operative control on the human-machine interactive device; when the user A selects one industrial product B on the human-machine interactive interface and subjects it to an operation, an operative control instruction for the industrial product B is generated; the industrial product B receives the operative control instruction and can perform a corresponding operation. The human-machine interactive device may be connected to the various industrial products via a network, and the two perform communication control directly. Of course, communication data transmission may also be performed between the human-machine interactive device and the industrial product via the edge computing device, to realize operative control. When the user A subjects the industrial product B to operative control on the human-machine interactive interface, the human-machine interactive device will send trigger information to the edge computing device, to trigger the edge computing device to perform the operations in boxes S101-103.

During actual application, historical operation data may be stored on the human-machine interactive device, therefore the edge computing device may acquire historical operation data of the user for the industrial product from the human-machine interactive device. Product data may be stored in the edge computing device, the industrial product or a cloud platform, therefore the edge computing device may acquire product data of the industrial product from the edge computing device itself, the industrial product or the cloud platform.

During actual application, the product data may comprise a configuration file, a work log file or a key parameter etc. of the industrial product. The historical operation data may comprise information such as an operation log of the user.

In the preceding example, the edge computing device acquires from the industrial product B the product data thereof, and acquires from the human-machine interactive device the historical operation data of the user A for the industrial product B.

In box S102, the edge computing device determines at least one feature description tag of the industrial product on the basis of the product data, and takes the at least one feature description tag of the industrial product as a feature of the industrial product; and/or determines at least one feature description tag of the user on the basis of the historical operation data, and takes the at least one feature description tag of the user as a feature of the user.

During particular implementation, the process of the edge computing device determining the feature of the industrial product, i.e. the process of determining at least one feature description tag of the industrial product on the basis of the product data, may comprise:

extracting from the product data a key field describing the industrial product; computing a degree of similarity between multiple preset product feature description tags and the key field respectively; determining a product feature description tag with a degree of similarity higher than a first predetermined value as a feature description tag of the industrial product.

The key field is key information in the product data, specifically, the field with the highest degree of association with the industrial product in the product data.

The multiple preset product feature description tags may comprise feature description tags of multiple industrial products in multiple aspects, in order that a suitable feature description tag can be matched for any industrial product in the human-machine interactive device.

For example, through the above steps, multiple feature description tags of a machine tool may be obtained: numerically controlled machine tool, work duration, work load high, fault rate high, common fault.

As can be understood, some specifics of an industrial product can be learned by way of product features, e.g. product type, application scenario, work characteristics, common operations, function characteristics, etc.

During particular implementation, the process of the edge computing device determining the feature of the user, i.e. the process of determining at least one feature description tag of the user on the basis of the historical operation data, may comprise:

extracting from the historical operation data a key field describing the user; computing a degree of similarity between multiple preset user feature description tags and the key field respectively; determining a user feature description tag with a degree of similarity higher than a second predetermined value as a feature description tag of the user.

The key field is key information in the historical operation data, specifically, the field with the highest degree of association with the user in the historical operation data.

The multiple preset user feature description tags may comprise feature description tags of multiple users (e.g. maintenance personnel, operators, quality inspection personnel, etc.) in multiple aspects, in order that a suitable feature description tag can be matched for any user logged into the human-machine interactive device.

For example, through the above steps, multiple feature description tags of a user can be obtained: maintenance engineer, numerically controlled machine tool diagnostics, working time, working efficiency (e.g. troubleshooting success rate), common operations, etc.

As can be understood, some specifics of a user can be learned through user features, e.g. user identity, work objective (e.g. numerically controlled machine tool diagnostics), work characteristics, common operations, etc.

In box S103, the edge computing device sends the feature of the industrial product and/or the feature of the user to a human-machine interactive device for display on a human-machine interactive interface of the human-machine interactive device.

When the edge computing device sends the features of the industrial product and the user to the human-machine interactive device, the human-machine interactive device can thus perform display on the human-machine interactive interface thereof, and the user can thus learn some individualized information relating to the industrial product and the user on the human-machine interactive interface, in order to provide an effective reference for a subsequent operation of the user.

In the method provided in an embodiment of the present invention, on the basis of the acquired product data and/or historical operation data, the edge computing device obtains by analysis the user feature and the feature of the industrial product, which are then displayed on the human-machine interactive interface; the user feature and the feature of the industrial product are both described by at least one feature description tag; specifics such as the user's work content, work objectives and common operations can be learned by way of the at least one feature description tag of the user, and specifics such as the industrial product's work characteristics, common operations and function characteristics can be learned by way of the at least one feature description tag of the industrial product. The abovementioned user and industrial product specifics can provide a rational reference for operative control of the industrial product by the user, thereby achieving high efficiency and effectiveness of operative control.

Figure 2:
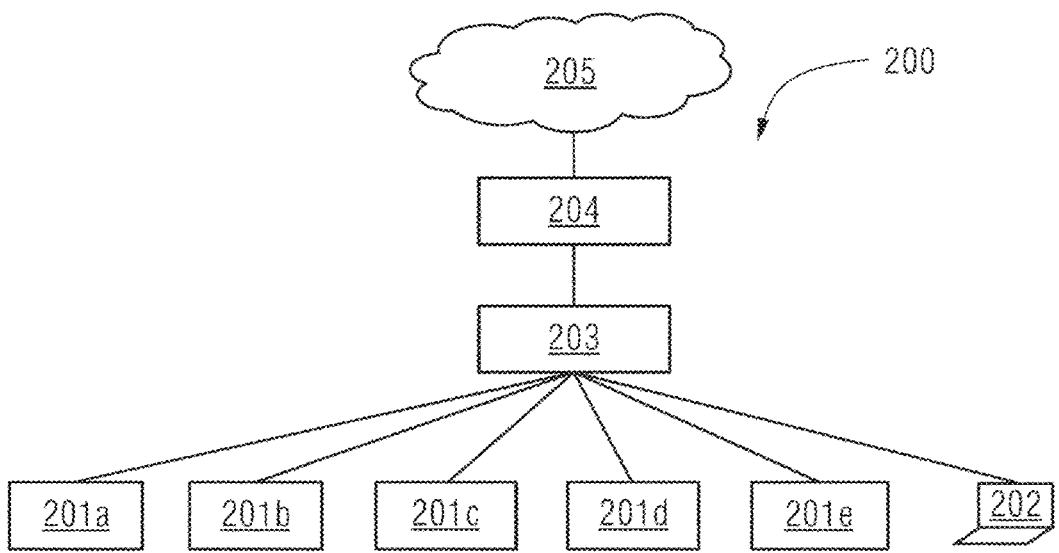
FIG. 2 is a structural schematic diagram of an information providing system in an embodiment of the present invention.

As can be understood, the individualized information providing method provided in the present invention may be realized on the basis of an information providing system 200, shown in FIG. 2; the information providing system 200 comprises multiple industrial products 201a-201e, a human-machine interactive device 202, an edge computing device 203, a gateway and/or firewall 204, and a cloud platform 205, wherein the edge computing device 203 is connected to all of the multiple industrial products 201a-201e, and the edge computing device is connected to the human-machine interactive device 202; the edge computing device 203 performs data communication with the cloud platform 205 via the gateway and/or firewall 204. The edge computing device 203 can determine a user feature and an industrial product feature on the basis of associated data acquired from the human-machine interactive device 202 and any industrial product (e.g. 201a), and the user feature and industrial product feature, which are individualized information, are then displayed on the human-machine interactive device 202. Of course, the human-machine interactive device 202 may also send the user feature and industrial product feature etc. to the cloud platform 205; the cloud platform 205 determines individualized information such as a recommended cloud function or a recommended operation on the basis of these data, and sends this individualized information via the edge computing device 203 to the human-machine interactive device 202 for display. For the providing of individualized information such as the recommended cloud function or recommended operation, reference may be made to the relevant content below.

In some embodiments, besides being able to provide individualized information such as the product feature and user feature to the user, it is also possible to provide individualized information such as a recommended function to the user. For this purpose, the individualized information providing method may further comprise:

the edge computing device sending the feature of the industrial product and the feature of the user to a cloud platform;

the cloud platform determining a recommended cloud function of the industrial product on the basis of the feature of the industrial product and the feature of the user, and sending the recommended cloud function via the edge computing device to the human-machine interactive device for display on the human-machine interactive interface.

It can be understood that the recommended cloud function is a cloud function that is recommended for the user; the cloud function that is recommended might be different for different users.

During actual application, a gateway or firewall etc. may be disposed between the edge computing device and the cloud platform, to ensure network security.

The cloud platform may determine the recommended cloud function in more than one way, two of which are presented below:

(1) Computing a degree of interest of the user for multiple preset cloud functions respectively on the basis of the feature of the industrial product and the feature of the user; and taking a cloud function with a degree of interest higher than a third predetermined value as the recommended cloud function.

The size of the third preset value may be set as required.

A first formula may be used to compute the degree of interest of the user for each cloud function, the first formula comprising:

$$\text{interest1} = \mu_{User} \sum\nolimits_{k=1}^{N} P_{User,k}{}^{*} q_{k,Func} + \mu_{product} \sum\nolimits_{k=1}^{N} P_{product,k}{}^{*} q_{k,Func}$$

In the formula, interest1 denotes the degree of interest of the user for the cloud function; $\mu_{User}$ denotes a weighting value of a relationship between the user and the cloud function; N denotes the number of feature description tags of the cloud function; $p_{User,\,k}$ denotes a degree of correlation of the user for a kth feature description tag of the cloud function; $q_{k,\,Func}$ denotes a weighting value of the kth feature description tag of the cloud function; $\mu_{product}$ denotes a weighting value of a relationship between the industrial product and the cloud function; $p_{product,\,k}$ denotes a degree of correlation of the industrial product for the kth feature description tag of the cloud function.

The $q_{k, Func}$ may be provided in advance by specialized personnel, but could also be computed by an algorithm; for example, the weighting value is computed via the term frequency-inverse document frequency.

The parameter $p_{User, k}$, i.e. the degree of correlation of the user for the kth feature description tag of the cloud function, may be understood as the degree of similarity between the kth feature description tag of the cloud function and the user, wherein the user is expressed using the at least one feature description tag. In other words, $p_{User, k}$ is the sum of the degrees of similarity of the kth feature description tag of the cloud function and the various feature description tags of the user.

The parameter $p_{product, k}$, i.e. the degree of correlation of the industrial product for the kth feature description tag of the cloud function, may be understood as the degree of similarity between the kth feature description tag of the cloud function and the industrial product, wherein the industrial product is expressed using the at least one feature description tag. In other words: the sum of the degrees of similarity of the kth feature description tag of the cloud function and the various feature description tags of the industrial product.

The parameter $\mu_{User}$, i.e. the weighting value of the relationship between the user and the cloud function, is for example a click rate of the user for the cloud function.

The parameter $\mu_{product}$, i.e. the weighting value of the relationship between the industrial product and the cloud function, is for example a click rate of the industrial product for the cloud function (i.e. a rate of use of the cloud function in the industrial product).

On the basis of the first formula, it can be learned that each cloud function may be expressed using multiple feature description tags, and via the formula above it is possible to obtain the degree of interest of the user for the various cloud functions respectively, and then select at least one cloud function with a high degree of interest as a recommended cloud function and send same to the edge computing device, which then sends the recommended cloud function to the human-machine interactive device for display on the human-machine interactive interface thereof, such that the user can make a selection according to his own needs.

(2) Subjecting multiple preset cloud functions to collaborative filtering on the basis of the feature of the industrial product, to obtain at least one first cloud function; subjecting multiple preset cloud functions to collaborative filtering on the basis of the feature of the user, to obtain at least one second cloud function; and taking a joint cloud function of the at least one first cloud function and the at least one second cloud function as the recommended cloud function.

It can be understood that collaborative filtering, described in simple terms, is using the likes of a group having similar interests and common experience to recommend information of interest to the user; an individual gives a response for the degree of information suitability (e.g. a score) via a cooperation mechanism and makes a record, in order to achieve the objective of filtering and thereby help others to screen information. Based on this principle, on the basis of the feature of the industrial product, multiple cloud functions are subjected to collaborative filtering, and a cloud function of comparative interest to at least one industrial product can be obtained, i.e. the first cloud function; on the basis of the feature of the user, multiple cloud functions are subjected to collaborative filtering, and a cloud function of comparative interest to at least one user can be obtained, i.e. the second cloud function; the intersection of the first cloud function and the second cloud function is then found, to obtain the recommended cloud function.

Since a collaborative filtering algorithm has outstanding filtering speed and robustness, it is hot in the field of the world wide web, hence the use of collaborative filtering to determine the recommended cloud function can increase algorithm speed and robustness.

It can be understood that regardless of which method is used to determine the recommended cloud function, cloud functions that are recommended can all be divided into basic cloud functions and high-level cloud functions.

During actual application, the cloud platform may use Big Data tools to realize the two recommended cloud function computing processes described above; there are many types of such Big Data tools, e.g. Hadoop, Spark, Scala and MapReduce, etc.

Figure 3:
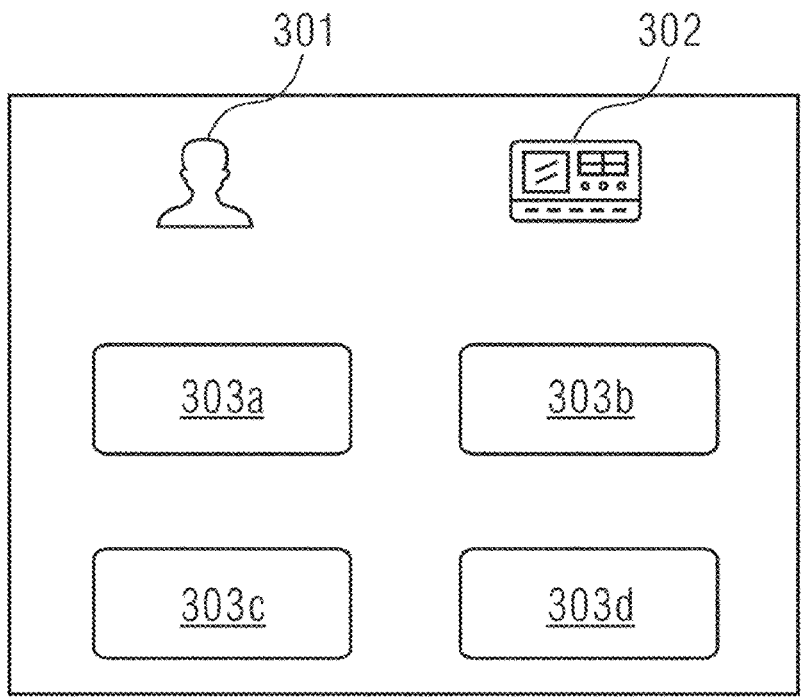
FIG. 3 is a schematic diagram of a human-machine interactive interface displaying an industrial product feature, a user feature and a recommended function in an embodiment of the present invention.
Figure 4:
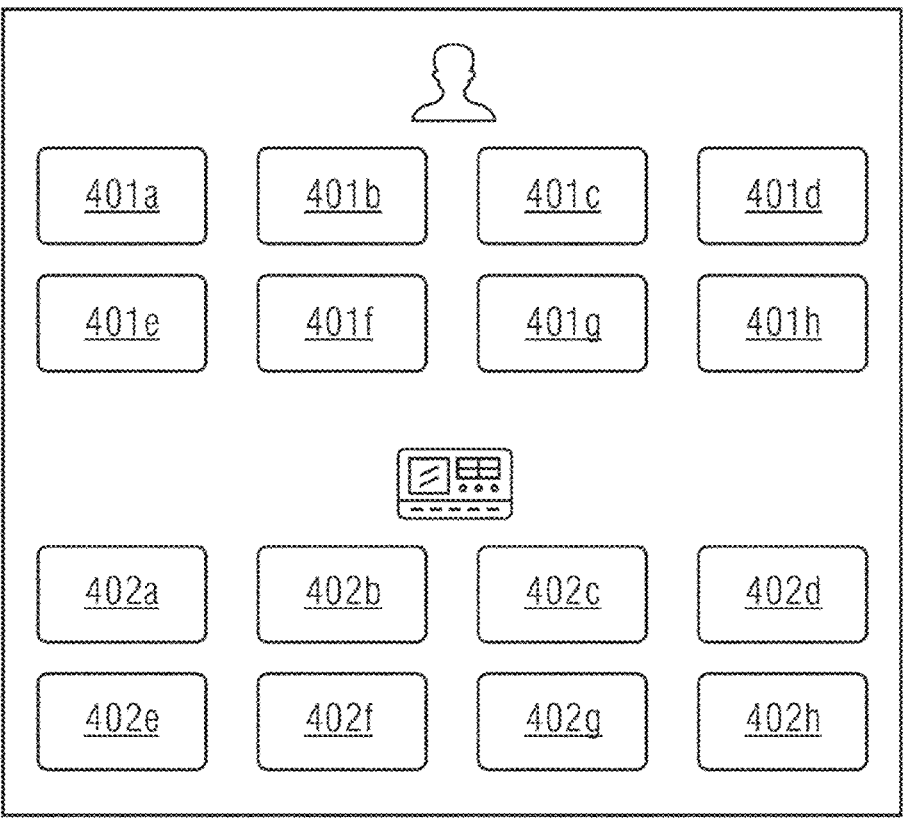
FIG. 4 is a schematic diagram of a human-machine interactive interface displaying feature description tags in an industrial product feature and a user feature in an embodiment of the present invention.

As an example, as shown in FIG. 3, a user feature icon 301 and an industrial product feature icon 302 are displayed on a human-machine interactive interface, and when a user clicks on and opens the icon 301 or 302, the human-machine interactive device will display the human-machine interactive interface shown in FIG. 4; multiple feature description tags 401a-401h of a user feature and multiple feature description tags 402a-402h of an industrial product feature are displayed in this interface, and some individualized information relating to a user and an industrial product can be learned via the human-machine interactive interface shown in FIG. 4. Furthermore, recommended functions are also displayed in FIG. 3: two recommended basic cloud functions 303a and 303b, and two recommended high-level cloud functions 304a and 304b, providing a reference for use of an industrial product by a user.

In some embodiments, besides any one piece of individualized information mentioned above, individualized information such as a recommended operation may also be provided for a user. For this purpose, the individualized information providing method may further comprise:

the edge computing device sending the feature of the industrial product, the feature of the user and current operation information of the user for the industrial product to the cloud platform;

the cloud platform determining a recommended operation of the user for the industrial product on the basis of the feature of the industrial product, the feature of the user and the current operation information, and sending the recommended operation via the edge computing device to the human-machine interactive device for display on the human-machine interactive interface.

It can be understood that the recommended operation may be obtained by the cloud platform by performing comprehensive analysis on the basis of the feature of the industrial product, the feature of the user and the current operation information.

The recommended operation may be an operation suggestion or a parameter value suggestion in an operating process, etc. The operation suggestion is for example a maintenance suggestion in a diagnostic or monitoring process.

Figure 5:
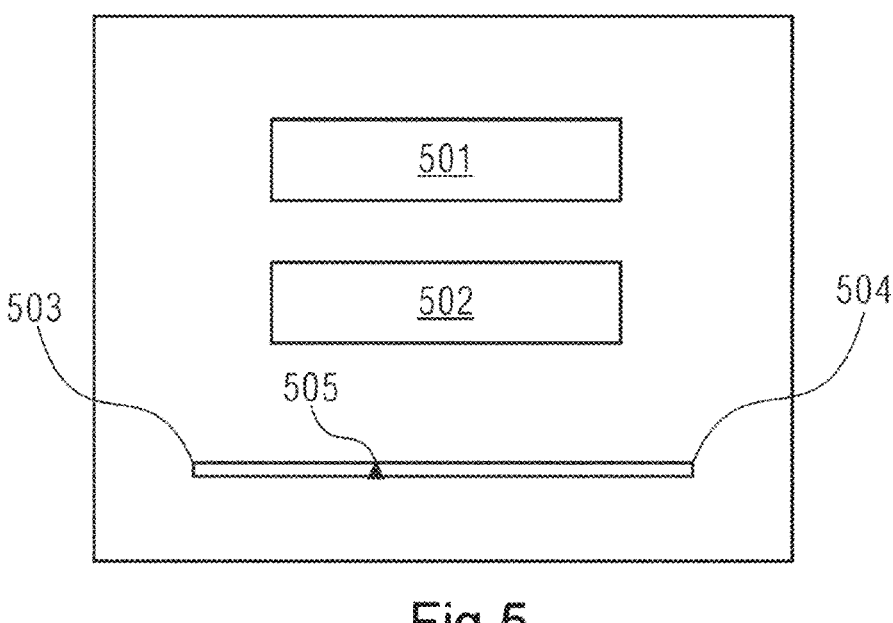
FIG. 5 is a schematic diagram of a human-machine interactive interface displaying a recommended parameter value in an embodiment of the present invention.

As an example, the human-machine interactive interface shown in FIG. 5 is an operation recommendation interface; the objective of the operation recommendation interface is to provide a suitable parameter value suggestion for a user. A parameter value input box 501 is displayed in the interface, and a value of a parameter may be inputted in the input box 501. A parameter recommended value display box 502 is also displayed in the interface, and a recommended value of the parameter is displayed in the display box 502. A parameter value display line is also displayed in the interface; a point 503 at the leftmost side on the display line is a minimum value of the parameter, a point 504 at the rightmost side on the display line is a maximum value of the parameter, and a position where a triangular marker 505 is located on the display line is a current value of the parameter.

Figure 6:
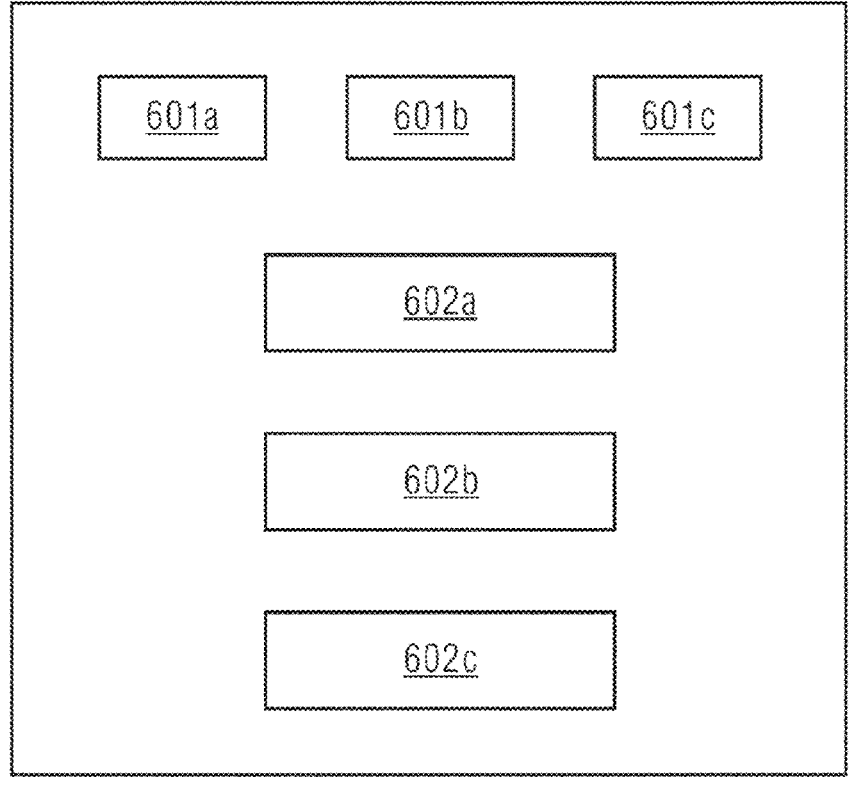
FIG. 6 is a schematic diagram of a human-machine interactive interface displaying a recommended maintenance suggestion in an embodiment of the present invention.

As an example, the human-machine interactive interface shown in FIG. 6 is an operation recommendation interface; the objective of the operation recommendation interface is to provide suitable diagnostic information and a maintenance suggestion for a user. Multiple fault warnings 601a-601c and multiple fault causes and corresponding maintenance suggestions 602a-602c are displayed in the interface; the cloud platform may obtain by analysis faults which might have occurred in an industrial product on the basis of data sent by the edge computing device, and then provide fault warning information, as well as fundamental causes of these faults and maintenance suggestions provided for these faults, so as to provide suitable individualized information for diagnosis and maintenance of the industrial product.

A method by which a fault warning can be displayed on a human-machine interactive interface may specifically be as follows: the cloud platform generating warning information on the basis of a fault which might arise in a current operation performed by the industrial product and sending the warning information via the edge computing device to the human-machine interactive device, so that the user can see a fault warning on the human-machine interactive interface; of course, it is also possible for the cloud platform to acquire a fault warning from the industrial product via the edge computing device, and then send the fault warning via the edge computing device to the human-machine interactive device.

A method by which a fault cause and maintenance suggestion can be displayed on a human-machine interactive interface may be as follows: the cloud platform finding a historical operation with the highest degree of similarity to a current operation, then sending a fault cause and maintenance suggestion corresponding to the historical operation with the highest degree of similarity to the human-machine interactive device, for display on the human-machine interactive interface.

During particular implementation, the process of the cloud platform determining a recommended operation of a user for an industrial product may comprise: computing a degree of interest of the user for multiple preset historical operations on the basis of the feature of the industrial product, the feature of the user and the current operation information, and taking a historical operation with a degree of interest higher than a fourth predetermined value as the recommended operation.

The multiple preset historical operations may be some optimized historical operations, and each of these historical operations may be marked with multiple description tags. As an example, a class of historical operations similar to the current operation is found according to a classification of historical operations, then a degree of similarity of each historical operation in the class of historical operations and the current operation is computed, and then historical operations with the highest degree of similarity are selected from the class of historical operations as the multiple preset historical operations.

The size of the fourth preset value may be set as required.

The cloud platform may use a second formula to compute the degree of interest of the user for each historical operation, the second formula comprising:

$$interest2 = \mu'_{User} \sum\nolimits_{K=1}^{M} p'_{User,\ k} {}^* q_{k,\ Operation} +$$
$$\mu'_{product} \sum\nolimits_{K=1}^{M} p'_{product,\ k} {}^* q_{k,\ Operation}$$

Here, interest2 denotes the degree of interest of the user for the historical operation; $\dot{\mu}_{User}'$ denotes a weighting value of a relationship between the user and the historical operation; $\dot{p}_{User,\ k}'$ denotes a degree of correlation of the user for a kth feature description tag of the historical operation; $q_{k,\ Operation}$ denotes a weighting value of the kth feature description tag of the historical operation; $\dot{\mu}_{product}'$ denotes a weighting value of a relationship between the industrial product and the historical operation; $\dot{p}_{product,\ k}'$ denotes a degree of correlation of the industrial product for the kth feature description tag of the historical operation; M is the number of feature description tags of the historical operation.

The $q_{k,\ Operation}$ may be provided by specialized personnel, but this weighting value may also be obtained by computing the term frequency-inverse document frequency.

The parameter $\dot{p}_{User,\ k}'$, i.e. the degree of correlation of the user for the kth feature description tag of the historical operation, may be understood as the degree of similarity between the kth feature description tag of the historical operation and the user, wherein a user feature is expressed using at least one feature description tag. In other words: the sum of the degrees of similarity of the kth feature description tag of the historical operation and the various feature description tags of the user.

The parameter $\dot{p}_{product,\ k}'$, i.e. the degree of correlation of the industrial product for the kth feature description tag of the historical operation, may be understood as the degree of similarity between the kth feature description tag of the historical operation and the industrial product, wherein the industrial product is expressed using at least one feature description tag. In other words: the sum of the degrees of similarity of the kth feature description tag of the historical operation and the various feature description tags of the industrial product.

The parameter $\dot{\mu}_{User}'$, i.e. the weighting value of the relationship between the user and the historical operation, is for example a click rate of the user for the historical operation.

The parameter $\dot{\mu}_{product}'$, i.e. the weighting value of the relationship between the industrial product and the historical operation, is for example a click rate of the industrial product for the historical operation (i.e. a rate of use of the historical operation in the industrial product).

By way of the formula above, it is possible to obtain the degree of interest of the user for the various operations respectively, and then select at least one operation with a high degree of interest as a recommended operation and send same to the edge computing device, which then sends the recommended operation to the human-machine interactive device for display on the human-machine interactive interface thereof, such that the user can make a selection according to his own needs.

In another embodiment, the present invention also provides an information providing system 200.

Referring to FIG. 2, the system 200 comprises: a human-machine interactive device 202; industrial products 201a-201e; and an edge computing device 203. The edge computing device 203 is connected to the human-machine interactive device 202 and the industrial products 201a-201e. The edge computing device 203 is used for acquiring product data of the industrial products 201a-201e and/or historical operation data of a user operating the industrial products 201a-201e; determining at least one feature description tag of the industrial products 201a-201e on the basis of the product data, and taking the at least one feature description tag of the industrial products 201a-201e as a feature of the industrial products 201a-201e; and/or determining at least one feature description tag of the user on the basis of the historical operation data, and taking the at least one feature description tag of the user as a feature of the user; and sending the feature of the industrial products 201a-201e and/or the feature of the user to the human-machine interactive device 202 for display on a human-machine interactive interface of the human-machine interactive device 202.

In some embodiments, the system 200 may further comprise: a cloud platform 205.

In this case, the edge computing device 203 is further used for sending the feature of the industrial products 201a-201e and the feature of the user to the cloud platform 205; the cloud platform 205 is used for determining a recommended cloud function of the industrial products 201a-201e on the basis of the feature of the industrial products 201a-201e and the feature of the user, and sending the recommended cloud function via the edge computing device 203 to the human-machine interactive device 202 for display on the human-machine interactive interface.

In some embodiments, the system 200 may further comprise: a cloud platform 205.

In this case, the edge computing device 203 is further used for sending the feature of the industrial products 201a-201e, the feature of the user and current operation information of the user for the industrial products 201a-201e to the cloud platform 205; the cloud platform 205 is used for determining a recommended operation of the user for the industrial products 201a-201e on the basis of the feature of the industrial products 201a-201e, the feature of the user and the current operation information, and sending the recommended operation via the edge computing device 203 to the human-machine interactive device 202 for display on the human-machine interactive interface.

As can be understood, the individualized information providing system provided in the present invention corresponds to the individualized information providing method; for particular embodiments, explanations, examples and beneficial effects of relevant content thereof, reference may be made to the corresponding parts of the individualized information providing method, which are not described again superfluously here.

The embodiments above are merely preferred embodiments of the present invention, which are not intended to limit it. Any amendments, equivalent substitutions or improvements etc. made within the spirit and principles of the present invention shall be included in the scope of protection thereof.

The invention claimed is:

1. An information providing method, comprising:

acquiring, via an edge computing device, product data of an industrial product and historical operation data of a user operating the industrial product, the historical operation data of the user including an operation log of the user;

determining, via the edge computing device, at least one feature description tag of the industrial product based upon the product data, and taking the at least one feature description tag of the industrial product as a feature of the industrial product;

determining, via the edge computing device, at least one feature description tag of the user based upon the historical operation data, and taking the at least one feature description tag of the user as a feature of the user;

sending, via the edge computing device, the feature of the industrial product and the feature of the user to a cloud platform;

determining, via the cloud platform, a recommended cloud function of the industrial product based upon the feature of the industrial product and the feature of the user by computing, via the cloud platform, a degree of interest of the user for each of multiple preset cloud functions, respectively, based upon the feature of the industrial product and the feature of the user and determining a cloud function, of the multiple preset cloud functions, with a degree of interest relatively higher than a third value, as the recommended cloud function; and sending, via the edge computing device, the recommended cloud function and at least one of the feature of the industrial product or the feature of the user to a human-machine interactive device for display on a human-machine interactive interface of the human-machine interactive device, wherein the degree of interest of the user for each respective cloud function of the multiple preset cloud functions is determined with a first formula, the first formula being $$\text{interest1} = \mu_{user} \sum\nolimits_{k=1}^{N} P_{user, \, k} {}^{*} q_{k, \, Func} + $$

$$\mu_{product} \sum\nolimits_{k=1}^{N} P_{product, \, k} {}^{*} q_{k, \, Func}$$

wherein interest1 denotes the degree of interest of the user for the cloud function, $\mu_{user}$ denotes a weighting value of a relationship between the user and the cloud function, N denotes a number of feature description tags of the cloud function, $P_{user, \, k}$ denotes a degree of correlation of the user for a kth feature description tag of the cloud function, $q_{k, \, Func}$ denotes a weighting value of the kth feature description tag of the cloud function, $\mu_{product}$ denotes a weighting value of a relationship between the industrial product and the cloud function, and $P_{product, \, k}$ denotes a degree of correlation of the industrial product for the kth feature description tag of the cloud function.

2. The method of claim 1, wherein at least one of the determining, via the edge computing device, the at least one feature description tag of the industrial product based upon the product data includes extracting from the product data, via the edge computing device, a key field describing the industrial product, computing a degree of similarity between the key field extracted and each of multiple preset product feature description tags, respectively, and determining a product feature description tag, of the multiple preset product feature description tags, with a degree of similarity relatively higher than a first value as a feature description tag of the industrial product; or the determining, via the edge computing device, the at least one feature description tag of the user based upon the historical operation data includes extracting from the historical operation data, via the edge computing device, a key field describing the user, computing a degree of similarity between the key field extracted and each of multiple preset user feature description tags, respectively, and determining a user feature description tag, of the multiple preset user feature description tags, with a degree of similarity relatively higher than a second value as a feature description tag of the user.

3. The method of claim 2, wherein the determining, via the cloud platform, the recommended cloud function of the industrial product based upon the feature of the industrial product and the feature of the user, comprises:

subjecting, via the cloud platform, multiple preset cloud functions to collaborative filtering based upon the feature of the industrial product, to obtain at least one first cloud function;

subjecting the multiple preset cloud functions to the collaborative filtering based upon the feature of the user, to obtain at least one second cloud function; and determining a joint cloud function of the at least one first cloud function and the at least one second cloud function as the recommended cloud function.

4. The method of claim 2, further comprising:

sending, via the edge computing device, the feature of the industrial product, the feature of the user and current operation information of the user for the industrial product to the cloud platform;

determining, via the cloud platform, a recommended operation of the user for the industrial product based upon the feature of the industrial product, the feature of the user and the current operation information; and sending the recommended operation, via the edge computing device, to the human-machine interactive device for display on the human-machine interactive interface.

5. The method of claim 4, wherein the determining, via the cloud platform, of the recommended operation of the user for the industrial product based upon the feature of the industrial product, the feature of the user and the current operation information comprises:

computing, via the cloud platform, a degree of interest of the user for each of multiple preset historical operations, respectively, based upon the feature of the industrial product, the feature of the user and the current operation information, and determining a historical operation, of the multiple preset historical operations, with a degree of interest relatively higher than a fourth value as the recommended operation.

6. The method of claim 5, wherein the cloud platform is configured to use a second formula to compute the degree of interest of the user for each historical operation, the second formula comprising:

$$\text{interest2} = \dot{\mu}_{user} \sum\nolimits_{K=1}^{M} \dot{P}_{user,\,k} {}^* \dot{q}_{k,\,Operation} +$$

$$\dot{\mu}_{product} \sum\nolimits_{K=1}^{M} \dot{P}_{product,\,k} {}^* \dot{q}_{k,\,Operation}$$

wherein interest2 denotes the degree of interest of the user for the historical operation;

$\dot{\mu}_{user}$ denotes a weighting value of a relationship between the user and the historical operation;

$\dot{P}_{user,\,k}$ denotes a degree of correlation of the user for a kth feature description tag of the historical operation;

$\dot{q}_{k,\,Operation}$ denotes a weighting value of the kth feature description tag of the historical operation;

$\dot{\mu}_{product}$ denotes a weighting value of a relationship between the industrial product and the historical operation;

$\dot{P}_{product,\,k}$ denotes a degree of correlation of the industrial product for the kth feature description tag of the historical operation; and M is a number of feature description tags of the historical operation.

7. The method of claim 1, wherein the determining, via the cloud platform, the recommended cloud function of the industrial product based upon the feature of the industrial product and the feature of the user, comprises:

subjecting, via the cloud platform, multiple preset cloud functions to collaborative filtering based upon the feature of the industrial product, to obtain at least one first cloud function;

subjecting multiple preset cloud functions to collaborative filtering based upon the feature of the user, to obtain at least one second cloud function; and determining a joint cloud function of the at least one first cloud function and the at least one second cloud function as the recommended cloud function.

8. The method of claim 1, further comprising:

sending, via the edge computing device, the feature of the industrial product, the feature of the user and current operation information of the user for the industrial product to a cloud platform;

determining, via the cloud platform, a recommended operation of the user for the industrial product based upon the feature of the industrial product, the feature of the user and the current operation information; and sending the recommended operation, via the edge computing device, to the human-machine interactive device for display on the human-machine interactive interface.

9. The method of claim 8, wherein the determining, via the cloud platform, of the recommended operation of the user for the industrial product based upon the feature of the industrial product, the feature of the user and the current operation information comprises:

computing, via the cloud platform, a degree of interest of the user for each of multiple preset historical operations, respectively, based upon the feature of the industrial product, the feature of the user and the current operation information, and determining a historical operation, of the multiple preset historical operations, with a degree of interest relatively higher than a fourth value as the recommended operation.

10. The method of claim 9, wherein the cloud platform is configured to use a second formula to compute the degree of interest of the user for each historical operation, the second formula comprising:

$$\text{interest2} = \dot{\mu}_{user} \sum\nolimits_{K=1}^{M} \dot{P}_{user,\,k} {}^* \dot{q}_{k,\,Operation} +$$

$$\dot{\mu}_{product} \sum\nolimits_{K=1}^{M} \dot{P}_{product,\,k} {}^* \dot{q}_{k,\,Operation}$$

wherein interest2 denotes the degree of interest of the user for the historical operation;

$\dot{\mu}_{user}$ denotes a weighting value of a relationship between the user and the historical operation;

$\dot{P}_{user,\,k}$ denotes a degree of correlation of the user for a kth feature description tag of the historical operation;

$\dot{q}_{k, \ Operation}$ denotes a weighting value of the kth feature description tag of the historical operation;

$\dot{\mu}_{product}$ denotes a weighting value of a relationship between the industrial product and the historical operation;

$\dot{P}_{product, \ k}$ denotes a degree of correlation of the industrial product for the kth feature description tag of the historical operation; and M is a number of feature description tags of the historical operation.

11. An information providing system, comprising:

a human-machine interactive device;

an industrial product; and an edge computing device, connected to the human-machine interactive device and the industrial product, configured to acquire product data of the industrial product and historical operation data of a user operating the industrial product, the historical operation data of the user including an operation log of the user, determine at least one feature description tag of the industrial product based upon the product data, and take the at least one feature description tag of the industrial product determined as a feature of the industrial product, determine at least one feature description tag of the user based upon the historical operation data, and take the at least one feature description tag of the user as a feature of the user, send the feature of the industrial product and the feature of the user to a cloud platform to determine a recommended cloud function of the industrial product based upon the feature of the industrial product and the feature of the user by computing, via the cloud platform, a degree of interest of the user for each of multiple preset cloud functions, respectively, based upon the feature of the industrial product and the feature of the user and determining a cloud function, of the multiple preset cloud functions, with a degree of interest relatively higher than a third value, as the recommended cloud function; and send the recommended cloud function and at least one of the feature of the industrial product or the feature of the user to the human-machine interactive device, for display on a human-machine interactive interface of the human-machine interactive device, wherein the degree of interest of the user for each respective cloud function of the multiple preset cloud functions is determined with a first formula, the first formula being $$\text{interest1} = \mu_{user} \sum_{k=1}^{N} P_{user, \ k} \, {}^{*}q_{k, \ Func} +$$

$$\mu_{product} \sum_{k=1}^{N} P_{product, \ k} \, {}^{*}q_{k, \ Func}$$

wherein interest1 denotes the degree of interest of the user for the cloud function, $\mu_{user}$ denotes a weighting value of a relationship between the user and the cloud function, N denotes a number of feature description tags of the cloud function, $P_{user, \ k}$ denotes a degree of correlation of the user for a kth feature description tag of the cloud function, $q_{k, \ Func}$ denotes a weighting value of the kth feature description tag of the cloud function, $\mu_{product}$ denotes a weighting value of a relationship between the industrial product and the cloud function, and $P_{product, \ k}$ denotes a degree of correlation of the industrial product for the kth feature description tag of the cloud function.

\* \* \* \* \*